United States Patent
Graziani et al.

(10) Patent No.: US 12,200,088 B1
(45) Date of Patent: Jan. 14, 2025

(54) NETWORK IMPROVEMENTS USING HIGHER-BANDWIDTH WIRELESS COMMUNICATION PROTOCOLS

(71) Applicant: Amazon Technologies, Inc., Seattle, WA (US)

(72) Inventors: Mark Graziani, Salem, NH (US); Jonathan Adams, Oakland, CA (US); Julian Gorfajn, Brookline, MA (US); Brian Douglas Magnuson, North Andover, MA (US); Frederick Roland Carter, Salem, NH (US); Cheng-Po Chen, Keelung (TW); Kuei-Chih Tao, Taipei (TW)

(73) Assignee: Amazon Technologies, Inc., Seattle, WA (US)

(*) Notice: Subject to any disclaimer, the term of this patent is extended or adjusted under 35 U.S.C. 154(b) by 5 days.

(21) Appl. No.: 18/194,284

(22) Filed: Mar. 31, 2023

(51) Int. Cl.
| | |
|---|---|
| H04L 5/16 | (2006.01) |
| H04B 1/38 | (2015.01) |
| H04L 69/18 | (2022.01) |
| H04N 17/00 | (2006.01) |

(52) U.S. Cl.
CPC .............. *H04L 69/18* (2013.01); *H04B 1/38* (2013.01); *H04N 17/004* (2013.01)

(58) Field of Classification Search
CPC ............. G06Q 10/20; G06Q 10/06312; G06Q 10/087; G06Q 20/3224; G06Q 20/223; G06Q 20/42; H04W 4/023; H04W 4/027; H04W 12/04; H04W 16/28; H04W 84/18; H04L 41/12; H04L 67/104
USPC .......................................................... 375/219
See application file for complete search history.

(56) References Cited

U.S. PATENT DOCUMENTS

| | | | |
|---|---|---|---|
| 10,045,057 B2* | 8/2018 | Shah ................... | H04N 21/6582 |
| 11,017,376 B1* | 5/2021 | Dietrich ................ | H04W 4/027 |
| 11,354,643 B2* | 6/2022 | Evans ..................... | G06Q 20/32 |
| 2017/0245101 A1* | 8/2017 | Chandrasekaran ..... | H04L 67/52 |

* cited by examiner

*Primary Examiner* — Khai Tran
(74) *Attorney, Agent, or Firm* — Lee & Hayes, P.C.

(57) ABSTRACT

Provided herein are techniques for enabling communications between an access point (AP) and a number of stations (STAs) while maximizing transmission quality and/or minimizing power consumption. For example, an STA may be associated with a camera device used to capture video data and transmit the video data to the AP, and the AP may be configured to receive a registration request from the STA, register the STA, receive video data from the STA, and transmit the video data to a backend system such as a storage server. In some cases, the AP and STAs may communicate using a communication bandwidth that is sub-GHz but has a higher bandwidth relative to the low-bandwidth sub-GHz communication protocols discussed above. An example of such a high-bandwidth sub-GHz communication protocol is one that supports data transmission (e.g., video data transmission) using a bandwidth of 900 megahertz (MHz).

44 Claims, 8 Drawing Sheets

| Beacon Version (16b) | | | AP Radio Version (16b) | |
|---|---|---|---|---|
| Period (32b) | | | | |
| Timeslot (32b) | | | | |
| Previous Timestamp LSB (32b) | | | | |
| Previous Timestamp MSB (32b) | | | | |
| SCI Table (Variable) | | | | |

| N_Stations (8b) | | | N_Entries (8b) | |
|---|---|---|---|---|
| Default Entry (4B) | Reserved (4B) | | N_Content (4b) | |
| Station 0 (16b) | | | | |
| Station 1 | | | | |
| ... | | | | |
| Station N | | | | |
| B | | | SCI Data (12b) | |
| Entry 1 | | | | |
| ... | | | | |
| Entry N | | | | |
| Repeat Count (3B) | T | Entry Index (4b) | AP Index (4b) | Station Index (4b) |
| Content 1 | | | | |
| ... | | | | |
| Content N | | | | |

FIG. 8

NETWORK IMPROVEMENTS USING HIGHER-BANDWIDTH WIRELESS COMMUNICATION PROTOCOLS

BACKGROUND

Camera devices are increasingly ubiquitous. Frequently, camera devices transmit video data using a communication protocol in accordance with Institute of Electrical and Electronics Engineers (IEEE) standards under the 802.11 umbrella, commonly referred to as Wi-Fi.

In some existing systems, a camera device may also receive control information using a sub-gigahertz (sub-GHz) communication protocol.

One advantage of use of such a sub-GHz protocol may be lower power consumption as compared to Wi-Fi. However, these protocols generally have a low bandwidth (meaning data transmission capacity over a period of time) which limits transmission capabilities. A protocol with a low data transmission capacity over a period of time may be unsuitable for transmitting data generated at higher data rates, such as video data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an exemplary schema for a beacon packet, and for a Slot Control Interface (SCI) table of such a beacon packet.

DETAILED DESCRIPTION

Figure 1:
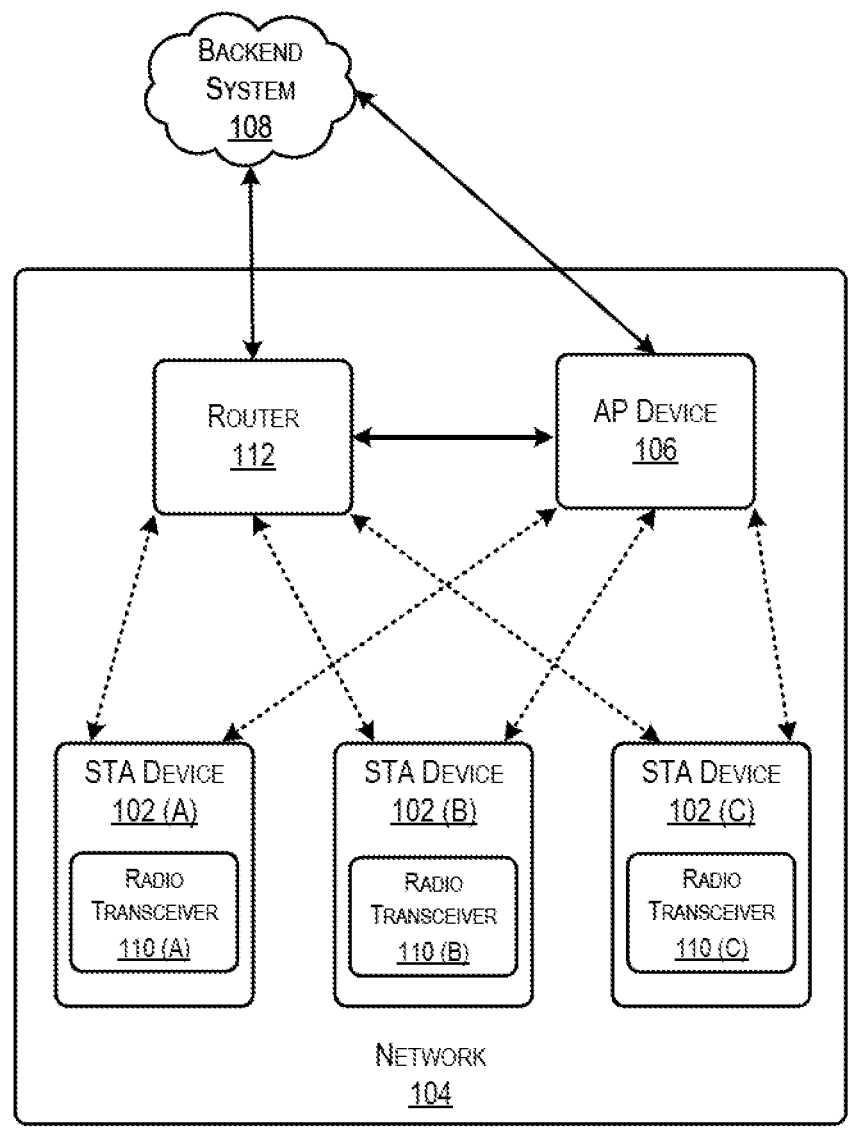
FIG. 1 depicts an example environment in which a system may be implemented to use higher-bandwidth communication protocols in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

It will be appreciated that the word bandwidth is commonly utilized to refer to two distinct things. In a first sense, it is commonly used to refer to data transmission capacity over a period of time. In a second sense, it is commonly used to refer to a frequency range or spectrum. For clarity, it is noted that the word bandwidth is used herein in both senses, with the intended sense being understood based on context. Where it is unclear which context is intended, this document is intended to be interpreted as encompassing both possible interpretations. It will further be appreciated that the term data rate is generally used to refer to an actually measured data transfer rate over a period of time, rather than a hypothetical data transmission capacity over a period of time. However, in the interest of clarity, communication protocols or schemes that have a low bandwidth (meaning a low data transmission capacity over a period of time) will sometimes be referred to herein as low data rate (or LDR) protocols or schemes, rather than as low-bandwidth protocols or schemes. Similarly, in the interest of clarity, communication protocols or schemes that have a high bandwidth (meaning a high data transmission capacity over a period of time) will sometimes be referred to herein as high data rate (or HDR) protocols or schemes, rather than as high-bandwidth protocols or schemes.

This disclosure describes, in part, techniques for enabling communications between an access point (AP) and a number of stations (STAs) while maximizing transmission quality and/or minimizing power consumption. For example, an STA may be a camera device used to capture video data and transmit the video data to the AP, and the AP may be configured to receive a registration request from the STA, register the STA, receive video data from the STA, and send the video data to a backend system such as a storage server. In accordance with one or more preferred implementations, an AP is a sync module that is itself connected to a wide area network such as the Internet via a wireless network or connection (e.g. a connection to a Wi-Fi network of a router), or a wired network or connection (e.g. an ethernet connection).

In some existing systems, the AP and the STAs communicate using a sub-gigahertz (GHz) communication protocol with low bandwidth (meaning a low data transmission capacity over a period of time) that can be characterized as a low-frequency radio (LFR) protocol based on its use of sub-GHz frequencies. LFR operates with a Gaussian frequency-shift keying (GFSK) modulation scheme capable of data transfer at a rate of 50 kilobits per second (kbps).

For example, the AP and the STAs may communicate using a low data rate sub-GHZ communication protocol (such as LFR) to register the STA with the AP and/or to transmit command and control (C&C) signals (e.g., transmit management frames and/or control frames from the AP to the STAs).

In accordance with one or more preferred implementations, an LFR protocol operates using sixty-four different 400 kHz channels beginning at 903.4 MHz and ending at 927.6 MHz. In accordance with one or more preferred implementations, an LFR protocol operates using sixty-four different 100 kHz channels beginning at 863.1 MHz and ending at 869.4 MHZ. In accordance with one or more preferred implementations, an LFR radio packet includes a 5-byte preamble, a 2-byte sync word, and up to 64 bytes of packet content.

Sync words are used by the radio hardware to help identify the start of a packet. In accordance with one or more preferred implementations, each device is configured to send and listen for one given sync word at a time. If a device radio receives a valid packet, but that packet has a sync word which is different than the currently configured sync word, then the device radio will ignore the packet and the device application layer will not be made aware of the packet.

In accordance with one or more preferred implementations, sync words are 2 bytes. All station devices (e.g. camera devices) initially use a hardcoded sync word during an initial beacon finding flow, which occurs when a station device first starts up and establishes a connection with a sync module (operating as an access point). After a camera device establishes communication with a sync module, the sync module will send the camera device a network-specific sync word, which the sync module generates as a function of a network ID, which in turn is provided to the sync module by a remote system. In accordance with one or more preferred implementations, there are 16384 different possible network-specific sync words, 0xC000-0xFFFF.

In accordance with one or more preferred implementations, an LFR protocol operates on a repeating schedule which is split up into slots, e.g. 100 ms slots. For each flow, a given packet is expected to be sent and received in specific periods or slots within the schedule.

In accordance with one or more preferred implementations, an LFR protocol operates with an SM sending out a beacon packet periodically (e.g. every 5 seconds) during a set period (comprising one or more slots), and each camera will listen for a Beacon packet periodically (e.g. every 10 seconds, targeting the middle of the set period). Beacon packets primarily contain two pieces of information: a system time and a beacon packet index. The system time represents the time in seconds since the sync module has powered on; this is used to drive frequency hopping. The beacon packet index is used to compensate for small deviations in a station device clock with respect to the sync module clock, in order to ensure that the two devices remain on the same schedule. Throughout the set period, the sync module will continuously send duplicate beacon packets, however, these duplicates do vary in their packet indices. Because each beacon packet is 13 bytes in total (5 bytes of preamble, 2 bytes of sync word, and 6 bytes of data), given the 50 kpbs signal, each beacon packet takes about 2.08 ms to send. A station device uses the index value to determine how far off of the center of the set period the beacon packet it received is and compensate in terms of 1.92 ms increments for the next listening period. If the station device only listens for beacon packets every 10 seconds, and targets the middle of a 100 ms window, a 50 ms timer deviation would be enough for it to lose beacon following-maintaining an accuracy of less than a 50 ms deviation for every 10 seconds means that timing of the LFR schedule must be at least 99.5% accurate.

If a station device fails to receive a beacon packet, then it will listen for beacon packets more often (e.g. every 5 seconds instead of every 10 seconds) until it successfully receives one. If a device fails to receive a beacon packet on seven consecutive attempts, then it will go back to an initial beacon finding flow.

When a station device (e.g. a camera device) first boots, it attempts to establish communication with a sync module by way of the initial beacon finding flow. Before the camera has established communication, it doesn't have any mechanism to align to the sync module's schedule, so it sends out three beacon request packets, each on a different channel, at a set interval (e.g. every 650 ms), attempting to eventually hit a nearby sync module's set period. The beacon requests primarily contain a 16-byte hash of a station device's unique identifier, which is used to self-identify.

During a first period, if the sync module does not have any commands pending that need to be propagated over LFR, then it will be listening for beacon requests on one of three beacon request channels, in rotation. If a sync module receives a beacon request, it will validate the 16-byte camera unique identifier hash against unique identifier hashes of cameras associated with the sync module network (e.g. based on data at the sync module or based on communicating with a remote system).

From the point that a station device sends a beacon request packet, it waits (in a low power mode) for 400 ms to listen for beacon request reply packets for up to 12 ms on each of the beacon request reply channels, attempting to target a second period. If a sync module received a valid beacon request during a first period, it will continuously send duplicate beacon request reply packets throughout the entirety of a second period on one given beacon request reply channel. The beacon request reply contains data critical for the camera to communicate on the sync module network, including the network-specific sync word, the amount of time until the sync module sends the next beacon packet, and which channel that next beacon packet will be sent on.

Throughout a set period, the sync module will continuously send duplicate beacon packets. Typically, the sync module sends a beacon packet at a set interval (e.g. every 5 seconds), however, if it received a valid beacon request, then it will send a "special" beacon packet off-cycle as well. The beacon request reply will indicate to the camera when the next beacon packet will be sent, as well as how long to wait for the next on-cycle beacon packet, if the very next one happens to be "special". Once the camera receives a beacon request reply during a second period, it will wait the appropriate amount of time as indicated by the beacon request reply contents, and listen for a beacon packet for a set amount of time (e.g. 9 ms), targeting the middle of the set period. After receiving the first beacon packet, the camera will begin to listen for a beacon packet on a set schedule (e.g. every 10 seconds), aligning its listening with the sync module's standard beacon packet cycles, to initiate a beacon follow flow.

One potential advantage of a low data rate communication protocol like LFR may be lower power consumption relative to communication protocols with higher bandwidths (meaning data transmission capacity over a period of time). However, having a lower bandwidth (meaning data transmission capacity over a period of time) obviously limits the transmission capabilities of the corresponding communication protocol. For example, a protocol with a low data transmission capacity over a period of time may be unsuitable for transmitting data generated at higher data rates, such as video data. Accordingly, a protocol such as LFR is unsuitable for streaming video. For example, traditionally, a STA using LFR to communicate control information would use Wi-Fi to communicate video data.

According to one or more implementations of this disclosure, the AP and the STAs may communicate using a sub-GHz communication protocol with a higher bandwidth (meaning a higher data transmission capacity over a period of time, not necessarily a wider frequency spectrum, although that is possible as well). For example, the AP and STAs may communicate using a sub-GHz but has a higher data transmission capacity over a period of time relative to the lower transmission capacity sub-GHz communication protocols discussed above. Such a high-bandwidth sub-GHz communication protocol may be a 900-megahertz (MHz) communication protocol. In some cases, the high-bandwidth sub-GHz protocol uses a modulation scheme such as quadrature amplitude modulation (QAM). For example, the high-bandwidth sub-GHz protocol may use QAM-16. In some cases, a high data transmission capacity sub-GHz protocol supports five channels, each having a bandwidth (meaning frequency range) of 2 MHZ, to provide 4.33 Mbps raw data rate per channel. In accordance with one or more preferred implementations, each of four of these channels is centered at a respective one of 919 MHZ, 921 MHz, 923 MHZ, and 925 MHz. In accordance with one or more preferred implementations, another channel is centered at 917 or 927 MHz. In accordance with one or more preferred implementations, another channel is centered at 903 or 905 MHz. In accordance with one or more preferred implementations, a plurality of channels (e.g. 2-6 channels) are utilized that each may be centered at a respective one of 903 MHz, 905 MHZ, 919 MHz, 921 MHz, 923 MHZ, and 925 MHZ.

In some cases, a proposed system uses a high data rate sub-GHz communication protocol to transmit video data. For example, an STA may capture video data using a camera associated with the STA and transmit the captured video data to the AP using the high data rate sub-GHz communication protocol.

In accordance with one or more preferred implementations, a high data rate sub-GHZ communication protocol is implemented to transmit data frames (e.g., video data frames) in a manner that ensures that the use of the high data rate sub-GHz protocol is backward compatible with other communication protocols used in the same system, allocates bandwidth for the high data rate sub-GHz protocol among various STAs, and reduces power consumption of a camera device that uses the high-bandwidth sub-GHz protocol to transmit video frames.

One technical problem addressed by some implementations of the present disclosure relates to ensuring backward compatibility between the use of a high data rate communication protocol (e.g., a high data rate sub-GHz communication protocol) and a system that uses a low data rate communication protocol (e.g., a low data rate sub-GHz communication protocol) to enable registration/set up and/or C&C functionalities. As described above, in some existing systems, a low data rate sub-GHz communication protocol like LFR is used to enable registration of STAs and/or to transmit C&C signals (e.g., transmit management frames and/or control frames from the AP to the STAs). For example, in some existing systems, an AP and an STA communicate using a low data rate sub-GHz communication protocol to register the STA with the AP as well as to transmit C&C signals between the AP and the STAs. In these described existing systems, it may be important that the use of a high data rate communication protocol to transmit data frames does not disrupt the underlying registration/setup and/or C&C mechanisms of the system. Accordingly, it may be desirable to ensure that the using a high data rate communication protocol to transmit data frames is backward compatible with a system that uses a low data rate communication protocol to enable registration and C&C functionalities.

To ensure backward compatibility between a high data rate protocol and a system that uses a low data rate protocol for registration and/or C&C functionalities, some implementations of the present disclosure use the low data rate protocol to register an STA for high data rate protocol communications, or distribute credentials for use for high data rate protocol communications. In some cases, after an STA registers for communication with the AP using the low data rate protocol, the AP uses the low data rate protocol to transmit one or more access credentials (e.g., one or more tokens or passwords) to the STA.

In some examples, an STA registers for communication using a high data rate protocol using the following techniques: after the STA is turned on, the STA receives a beacon frame from the AP. The beacon frame may be a management frame that serves to announce the presence of a wireless network associated with the AP, and synchronize members of the network. In response to the beacon frame, the STA transmits a request to register with the AP. Preferably, this request includes a device identifier. In response to the registration request, the AP generates and transmits a device identifier to the STA. Subsequently (e.g., in response to a second registration request by the STA), the AP establishes a secure wireless communication session between the AP and the STA and transmits one or more access credentials to the STA. The secure communication session may be associated with the low data rate protocol. The access credentials may include an access credential for establishing a wireless communication session using the high data rate sub-GHZ communication protocol. The access credentials may also include an access credential for establishing another wireless communication session, such as establishing a wireless communication session with another device (e.g., a router) using an IEEE 802.11 (Wi-Fi) communication protocol.

In some cases, to enable an STA to transmit a data frame (e.g., a video frame) to an AP using a high data rate communication protocol, the AP transmits an access credential to the STA using a low data rate communication protocol (e.g., using LFR). Subsequently, the STA may transmit a request to the AP using the low data rate communication protocol. The request may include an indication of the access credential. After the AP receives the request from the STA, the AP may establish a wireless communication session associated with the high data rate communication protocol. The STA may now be able to use the wireless communication session to transmit data frames to the AP.

Another technical problem addressed by some implementations of the present disclosure relates to allocating bandwidth of the high data rate protocol (such as a high data rate sub-GHz protocol) between a number of STAs in an accessible and flexible manner. In some cases, the high data rate protocol is used in a hub-and-spoke architecture in which STAs communicate with the AP and vice versa. Accordingly, it is important to divide the bandwidth of the high data rate protocol among various STAs (e.g., up to 16 STAs). This division scheme should ensure system-wide accessibility by enabling the STAs to periodically communicate with the AP without interference from other STAs as well as flexibility to enable STAs to have additional bandwidth when needed.

To allocate the bandwidth of a high data rate communication protocol among STAs in an accessible manner, some implementations of the present disclosure enable the AP to generate timeslot tables and transmit those tables to the STAs using beacon frames (e.g., periodically-transmitted beacon frames). In some cases, the AP generates a timeslot table by dividing a period into timeslots and assigns each timeslot to one of the STAs. The timeslot table may, for example, be a table that associates each device identifier for an STA with a set of one or more timeslots. Timeslot tables may be transmitted to STAs as part of beacon frames transmitted before the beginning of the period. In some cases, each timeslot table has an expiration time that is the end of the period. After an STA receives the timeslot table from the AP, the STA transmits frames to the AP during the timeslots allocated to the STA. An example of a period is a one-second period. An example of a timeslot is a 100 millisecond (ms) timeslot.

To allocate the bandwidth of a high data rate communication protocol among STAs in a flexible manner, some implementations of the present disclosure enable an STA to transmit a request for additional bandwidth to the AP during a timeslot assigned to the STA. The request may include an indication of the amount of additional bandwidth needed and/or an indication of a software application operation performed by the STA that requires the STA to have additional bandwidth. For example, the request may represent that the STA is being used to conduct a videoconference and, as such, the STA requires additional bandwidth. In some cases, subsequent to receiving the additional bandwidth, the AP generates the timeslot table for the next period by assigning timeslots to the requesting STA in a manner that accommodates the request. In some cases, allocation of the timeslots to the STAs is performed in a manner such that each STA has at least one timeslot to transmit requests for additional bandwidth and/or other C&C indications.

In some cases, a timeslot table transmitted to STAs before a period includes allocated timeslots for the next period as well as allocated timeslots for a number of subsequent periods. In some of those cases, the timeslot table has an expiration time that is at the end of the next period. In some cases, after the STA receives a pth timeslot table whose expiration time is the end of the pth period, the STA uses the pth timeslot table for the pth period after the pth begins and the (p−1)th the timeslot table for the (p−1)th period expires, even if the (p−1)th timeslot table includes timeslot allocations for the pth period. In some cases, if an STA does not receive the pth timeslot table from the AP (e.g., due to network errors) or if the beacon frame containing the pth timeslot table is corrupted, the STA may transmit data in the pth period in accordance with the (p−1)th timeslot table until the STA receives a new timeslot table (e.g., a (p+1)th timeslot table whose expiration date is the end of the (p+1)th period) from the AP.

Another technical problem addressed by some implementations of the present disclosure relates to reducing the power consumption of a system utilizing a high data rate communication protocol (e.g., a high data rate GHz protocol). In some cases, using a high data rate communication protocol causes an STA to use more power relative to using a low data rate communication protocol (e.g., a low data rate GHz protocol such as LFR). In some cases, depending on the distance and/or signal strength between transmission source and destination devices, using a high data rate communication protocol causes an STA to use more power relative to using another communication protocol (e.g., a communication protocol with a bandwidth that exceeds one GHz, such as a Wi-Fi protocol). Accordingly, it may be important to limit the use of the high data rate communication protocol in some instances to reduce the overall power consumption.

One proposed strategy to reduce the power consumption of a system using a high data rate communication protocol (e.g., a high data rate GHz protocol) is to use a low data rate communication protocol (e.g., a low data rate GHz protocol such as LFR) for registration and/or C&C purposes. In some cases, the timeslot table transmitted by an AP to the STAs includes times at which STAs should receive and/or transmit packets using the low data rate communication protocol. If the low data rate communication protocol uses a frequency-hopping mechanism, the timeslot table transmitted by an AP to the STAs may include times at which STAs should receive and/or transmit packets using the low data rate communication protocol as well as frequencies associated with those times. Accordingly, the high data rate communication protocol can be used in parallel with a low data rate communication protocol—an approach that enables using the low data rate communication protocol for transmissions that do not require a high data rate (e.g., for transmissions related to registration and/or C&C). By using use a low data rate communication protocol (e.g., a low data rate GHz protocol such as LFR) for tasks that do not require a high date rate, some implementations of the present disclosure reduce the use of more the high data rate communication protocol with its higher power consumption requirements, thus reducing the overall power consumption of the system.

Another proposed strategy to reduce the power consumption of a system using a high data rate communication protocol (e.g., a high data rate GHz protocol) is to determine whether to transmit data frames (e.g., video frames) using the high data rate communication protocol or another communication protocol (e.g., a Wi-Fi protocol) based on predictions about power consumption of transmission using the high data rate power consumption or the other communication protocol. For example, in some cases, an STA may determine: (i) a first distance between the STA and the AP, and (ii) a second distance between the STA and a Wi-Fi router. The STA may then determine a first predicted power consumption of a high data rate protocol transmission between the STA and the AP given the first distance and a second predicted power consumption of a Wi-Fi transmission between the STA and the router given the second distance. The STA may then use the first and the second predicted power consumptions to select an optimal protocol between the high data rate protocol and the Wi-Fi protocol.

As another example, in some cases, an STA may determine: (i) a first signal strength indicator between the STA and the AP, and (ii) a second signal strength indicator between the STA and a Wi-Fi router. The first signal strength indicator may, for example, be a received signal strength indicator (RSSI) for one or more signals received by the STA from the AP. The second signal strength indicator may, for example, be an RSSI for one or more signals received by the STA from the Wi-Fi router. The STA may then determine a first predicted power consumption of a high data rate protocol transmission between the STA and the AP given the first signal strength indicator and a second predicted power consumption of a Wi-Fi transmission between the STA and the router given the second signal strength indicator. The STA may then use the first and the second predicted power consumptions to select an optimal protocol between the high data rate protocol and the Wi-Fi protocol.

Embodiments of the disclosure provide for a number of advantages over conventional systems. For example, embodiments of the disclosure allow for enabling a system to transmit data with higher bitrates while reducing power consumption of the system. As another example, embodiments of the disclosure enable accessible and flexible allocation of bandwidth among various devices (e.g., among various STA devices) to increase the overall operational reliability of the system.

FIG. 1 depicts an example environment in which a system may be implemented to use a high data rate communication protocol in accordance with at least some embodiments. An exemplary system as depicted with respect to environment 100 may include a number of station (STA) devices 102 (A-C) included in a network 104. The network 104 may further include at least one access point (AP) device 106 that enables communication with one or more electronic devices outside of the network 104, such as a backend system 108.

It should be noted that the network 104 may include multiple AP devices. The environment 100 may also include a router 112 (e.g., a Wi-Fi router) that can communicate with the AP device 106 and a backend system 108, and may also be able to communicate with the STA devices 102.

A STA device 102 may be any electronic device configured to communicate with other devices on the network 104. In some cases, the STA device is a wireless sensor node equipped with one or more sensors, computing hardware, radio transceivers, and power components. The individual STA devices in the network (e.g., a wireless sensor network (WSN)) may be inherently resource-constrained, in that they may have limited processing speed, storage capacity, and communication bandwidth. The STA devices 102 may communicate among themselves or with the AP device 106 using radio signals. In accordance with one or more preferred implementations, a STA device 102 is a camera device.

Each of the STA devices 102 (A-C) may include at least a respective radio transceiver 110 (A-C). The radio transceiver 110 may be configured to both transmit and receive communications between the respective STA device 102 and another electronic device. The STA device may include medium access control (MAC) module or interface following the IEEE (Institute of Electrical and Electronics Engineers) 802.11 standards. A STA device may include a physical layer module or interface for radio media, and the term "STA" may, in its definition, include both an AP and a non-AP STA (station).

The network 104 may include any suitable local network of devices. In some embodiments, such a network 104 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 104 may include a wireless sensor network (WSN). In embodiments, the network 104 may be configured as a low-power (LP) version of a network type, such as a LPWAN. The devices in the network 104 might operate in either synchronous or asynchronous mode.

The AP device 106 may include any electronic device that provides an ingress/egress point for a network (e.g., network 104). In embodiments, the AP device 106 is a device that allows the management (control) of the network 104 and sends information received from the STA devices 102 to another device or system. The AP device 106 may act as a router for one or more STA devices 102. An example of an AP device 106 may include a sync module, router, routing switch, integrated access device, multiplexer, or any other suitable device. The AP device 106 may include one or more processors and a memory that stores computer executable instructions for implementing at least a portion of the functionality described herein.

In embodiments, the AP device 106 is configured to send and/or receive periodic transmissions to and/or from one or more of the STA devices 102. For example, the AP device 106 may be configured to provide authentication tokens for a high data rate communication protocol and/or for a Wi-Fi communication protocol to the STA devices 102. As another example, the AP device 106 may be configured to provide, to the STA devices 102, timeslot tables for allocating the high data rate communication protocol among the STA devices 102. In some cases, the transmissions performed by the AP device 106 may be performed as a series of beacon bursts. More particularly, rather than transmit a beacon frame a single time, multiple beacon frames may be transmitted in a sequence with short interframe spacing or a predetermined spacing interval between each of the transmissions.

The router 112 may be configured to enable the STA devices 102 to communicate with the AP device 106 and/or to the backend system 108 by using the router 112 as an intermediary device (e.g., using a wide area network (WAN)). In some cases, communication between an STA device 102 and the router 112 may use a communication protocol (e.g., Wi-Fi) that is distinct from the communication protocols (e.g., one or more sub-GHz communication protocols) used for direct communication between the AP device 106 and the STA devices 102.

The backend system 108 may be any suitable computing device or combination of computing devices configured to manage information collected via the STA devices 102 as described herein. In some embodiments, the backend system 108 is configured to provide instructions to one or more of the STA devices 102 via the AP device 106. In embodiments, the backend system 108 is configured to interact with a user device or other remotely located electronic device (e.g., via an application installed upon, and executed from, the user device).

In embodiments in which the AP device uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
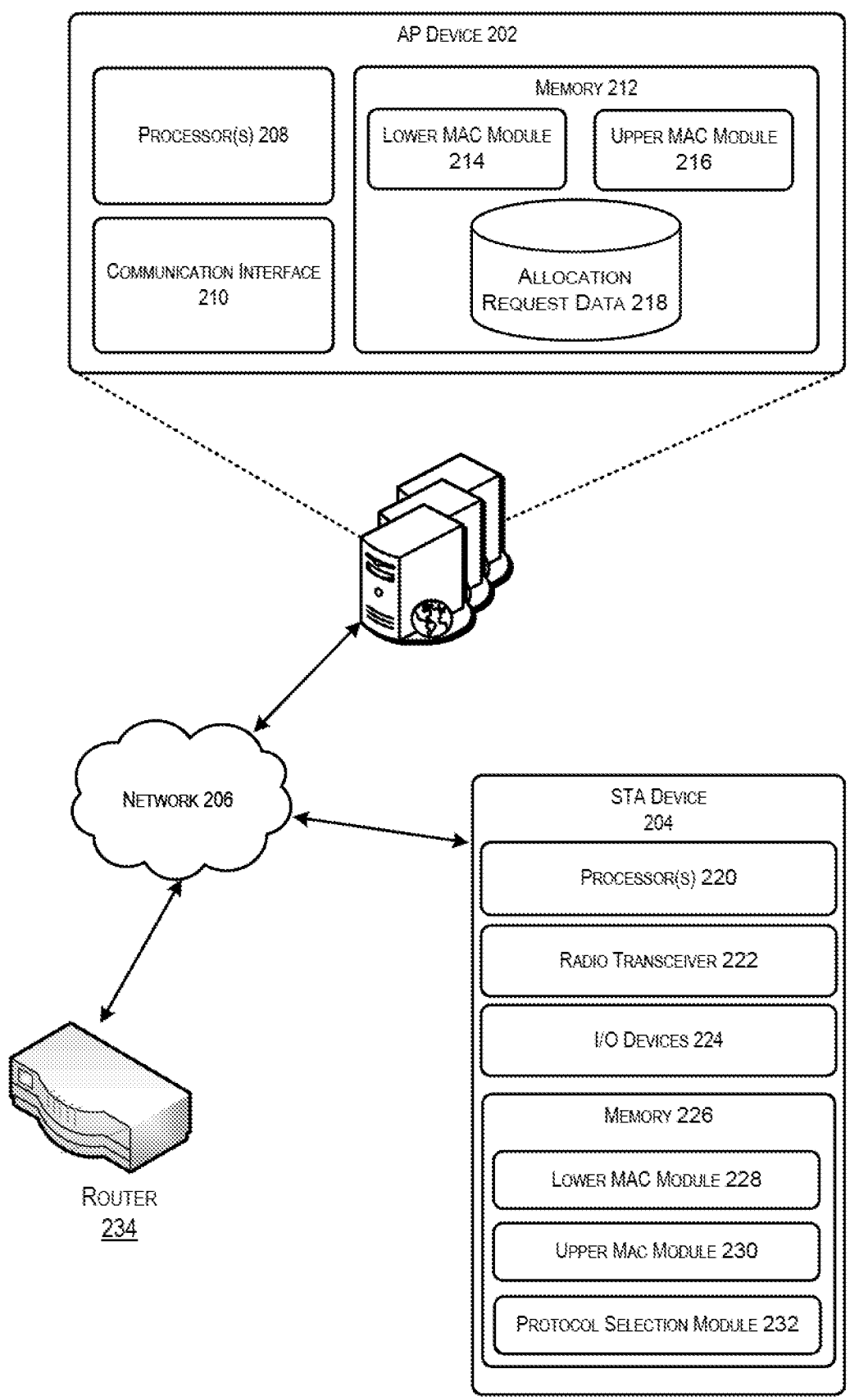
FIG. 2 depicts a system architecture that may be implemented to use higher-bandwidth communication protocols in accordance with at least some embodiments.

FIG. 2 depicts a system architecture that may be implemented to use a high data rate sub-GHz communication protocol in accordance with at least some embodiments. As shown in FIG. 2, an AP device 202 may be in communication with at least one STA device 204 and a router 234 via a network 206. The AP device 202, router 234, STA device 204, and network 206 may be examples of the respective AP device 106, router 112, STA device 102, and network 104 as described in relation to FIG. 1 above.

As noted above, the AP device may include any computing device configured to manage communications between a backend system and the STA devices 102 using communication techniques as described herein. As depicted, the AP device 202 may include a number of hardware components, such as one or more processors 208, a communication interface 210, and a memory 212.

As used herein, a processor 208 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The communication interface 210 may be any component configured to enable data to be communicated between electronic devices. The communication interface 210 may include one or more network interface controllers (NICs) or other types of transceiver devices to send and receive messages over network(s). For instance, the communication interface 210 may include a personal area network (PAN) component to enable messages over one or more short-range wireless message channels. For instance, the PAN component may enable messages compliant with at least one of the following standards IEEE 802.15.4 (ZigBec), IEEE 802.15.1 (Bluetooth), IEEE 802.11 (Wi-Fi), or any other PAN message protocol. Furthermore, the communication interface 210 may include a wide area network (WAN) component to enable message over a wide area network.

Memory 212 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 208.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 210, the I/O devices of the respective apparatuses, and so forth, and provide various services to applications or components executing on the processor(s) 208. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 212 in more detail, the memory 212 may include an operating system and one or more application programs or services for implementing the features disclosed herein including a lower MAC module 214, an upper MAC module 216, and allocation request data 218. The lower MAC module 214 may be a component of a MAC layer of the AP device 202 that interacts with a physical layer of the AP device 202. For example, the lower MAC module 214 may be configured to generate data frames corresponding to various communication protocols. In some cases, the lower MAC module 214 may be configured to generate Wi-Fi packets, low data rate sub-GHz protocol frames (e.g., LFR frames), high data rate sub-GHz protocol frames, and/or the like. In some cases, the lower MAC module 202 performs operations related to MAC protocol data unit transmissions and acknowledgement. In some cases, the lower MAC module 202 controls access to the connection medium associated with the AP device 202.

The upper MAC module 216 may be a component of the MAC layer of the AP device 202 that interacts with a logical link control layer of the AP device 202. For example, the upper MAC module 216 may be configured to associate the AP device 202 with a set of stations.

The allocation request data 218 may include data describing requests for additional bandwidth received from STA devices 204. An additional bandwidth request may be a request for allocation of additional bandwidth from the available bandwidth of a high data rate protocol (e.g., a high data rate sub-GHz protocol) used for transmitting data frames. The request may include an indication of the amount of additional bandwidth needed and/or an indication of a software application operation performed by the STA that requires the STA to have additional bandwidth. For example, the request may represent that the STA is being used to conduct a videoconference and, as such, the STA requires additional bandwidth.

The AP device may maintain information about statistics and/or characteristics associated with each of a number of types of STA devices. For example, information about particular STA devices may be provided by a manufacturer or seller of the STA device. Such information may include an indication of average or expected data values to be exhibited by such STA devices. For example, the information may include average maximum clock drift characteristics for the STA device, described in units of parts per million (PPM) that may be used to determine an accuracy of the clock included in a particular STA device. In such cases, the information may include an indication of an average PPM offset related to a crystal oscillator included in the STA device at room temperature. In some cases, an indication may be stored as to whether the device uses a TCXO compensation circuit to compensate for internal drift based on temperature variations.

In some cases, characteristic information may be provided by the STA device itself. For example, when the STA device 204 is provisioned onto the network 206, it may provide information about clock drift or other suitable characteristics. In another example, the STA device 204 may provide synchronization signals on a periodic basis. The timing of such synchronization signals may be compared against expected timing to determine an accuracy of the clock in the STA device.

The AP device may maintain information about a status of each STA device. In some cases, the information about the status of each STA device is updated as status information is received by the AP device from each of the STA devices. For example, one or more STA devices 204 may provide information about a current battery status. In this example, such information may include (but is not limited to) a state of charge (SOC), state of function (SOF), a state of health (SOF), and a variety of other values (e.g., temperature, etc.).

As noted above, the STA device 204 may be any electronic device configured to communicate with other devices on a network 206. As depicted, the STA device 204 may include a number of hardware components, such as one or more processors 220, a radio transceiver 222, one or more input/output devices 224, and a memory 226.

Similar to that of the AP device 202, a processor 220 may include multiple processors and/or a processor having multiple cores. Likewise, memory 226 may include volatile and nonvolatile memory, removable and non-removable media implemented in any method or technology for storage of information.

A radio transceiver 222 may include any suitable combination of transmitter and receiver circuitry. In some embodiments, the radio transceiver 222 may be included in a network interface card included within the STA device 204. In some cases, the radio transceiver may be external to the STA device 204, in that it may be separate from the STA device 204 but coupled to the STA device 204 via a physical connection.

An input device of the I/O devices 224 may be any component configured to enable a user to provide input to the STA device. Such an input device may include, but is not limited to, a button, a touch-sensitive surface, a switch, a slider, and/or any other type of device that allows a user to provide input to the STA device 204.

An output device of the I/O devices 224 may be any component capable of providing an output signal to a user. In some cases, an output device may comprise one or more lights that are powered up to provide an output signal to a user. In some cases, an output device may be a speaker capable of producing sound in response to an electrical signal input.

Turning to the contents of the memory 226 in more detail, the memory 226 may include an operating system and one or more application programs or services for implementing the features disclosed herein including a lower MAC module 228, an upper MAC module 230, and a protocol selection module 232.

The lower MAC module 228 may a component of a MAC layer of the station device 204 that interacts with a physical layer of the station device 204. For example, the lower MAC module 228 may be configured to generate data frames corresponding to various communication protocols. In some cases, the lower MAC module 228 may be configured to generate Wi-Fi packets, low data rate sub-GHz protocol frames (e.g., LFR frames), high data rate sub-GHZ protocol frames, and/or the like. In some cases, the lower MAC module 228 performs operations related to MAC protocol data unit transmissions and acknowledgement. In some cases, the lower MAC module 228 controls access to the connection medium associated with the AP device 228.

The upper MAC module 230 may be a component of the MAC layer of the station device 204 that interacts with a logical link control layer of the station device 204. For example, the upper MAC module 230 may be configured to associate the station with a respective AP device 202.

The protocol selection module 232 may be configured to determine an applicable communication protocol for each data item. For example, the protocol selection module 232 may determine that a registration/setup request should be transmitted using a low data rate sub-GHZ protocol (e.g., using LFR). As another example, the protocol selection module 232 may determine that a request for additional bandwidth associated with a high data rate sub-GHz protocol should be transmitted using the high data rate sub-GHz protocol. As a further example, the protocol selection module 232 may determine that a data frame should be transmitted in accordance with a high data rate sub-GHz protocol.

In some cases, the protocol selection module 232 may be configured to determine that a data frame should be transmitted using high data rate sub-GHz protocol if the protocol selection module 232 determines that the predicted power consumption associated with transmission of the frame using the high data rate sub-GHz protocol falls below the predicted power consumption associated with transmission of the frame using another protocol (e.g., a Wi-Fi protocol). In some cases, the protocol selection module 232 may be configured to determine that a data frame should be transmitted using another communication protocol (e.g., a Wi-Fi protocol) if the protocol selection module 232 determines that the predicted power consumption associated with transmission of the frame using the other protocol falls below the predicted power consumption associated with transmission of the frame using a high data rate sub-GHz protocol.

In some cases, the protocol selection module 232 may be configured to determine that a data frame should be transmitted using high data rate sub-GHz protocol if the protocol selection module 232 determines that the predicted transmission quality (e.g., packet loss rate) associated with transmission of the frame using the high data rate sub-GHz protocol exceeds the predicted transmission quality associated with transmission of the frame using another protocol (e.g., a Wi-Fi protocol). In some cases, the protocol selection module 232 may be configured to determine that a data frame should be transmitted another communication protocol (e.g., a Wi-Fi protocol) if the protocol selection module 232 determines that the predicted transmission quality associated with transmission of the frame using the other protocol exceeds the predicted transmission quality associated with transmission of the frame using a high data rate sub-GHz protocol.

In some cases, the protocol selection module 232 may be configured to determine that a data frame should be transmitted using high data rate sub-GHz protocol if the protocol selection module 232 determines that the predicted transmission score associated with transmission of the frame using the high data rate sub-GHz protocol exceeds the predicted transmission score associated with transmission of the frame using another protocol (e.g., a Wi-Fi protocol). In some cases, the protocol selection module 232 may be configured to determine that a data frame should be transmitted another communication protocol (e.g., a Wi-Fi protocol) if the protocol selection module 232 determines that the predicted transmission score associated with transmission of the frame using the other protocol exceeds the predicted transmission score associated with transmission of the frame using a high data rate sub-GHz protocol. In some cases, transmission score is determined based on a combination of the predicted power consumption of the corresponding transmission and the predicted transmission quality (e.g., packet loss rate) of the corresponding transmission.

Figure 3:
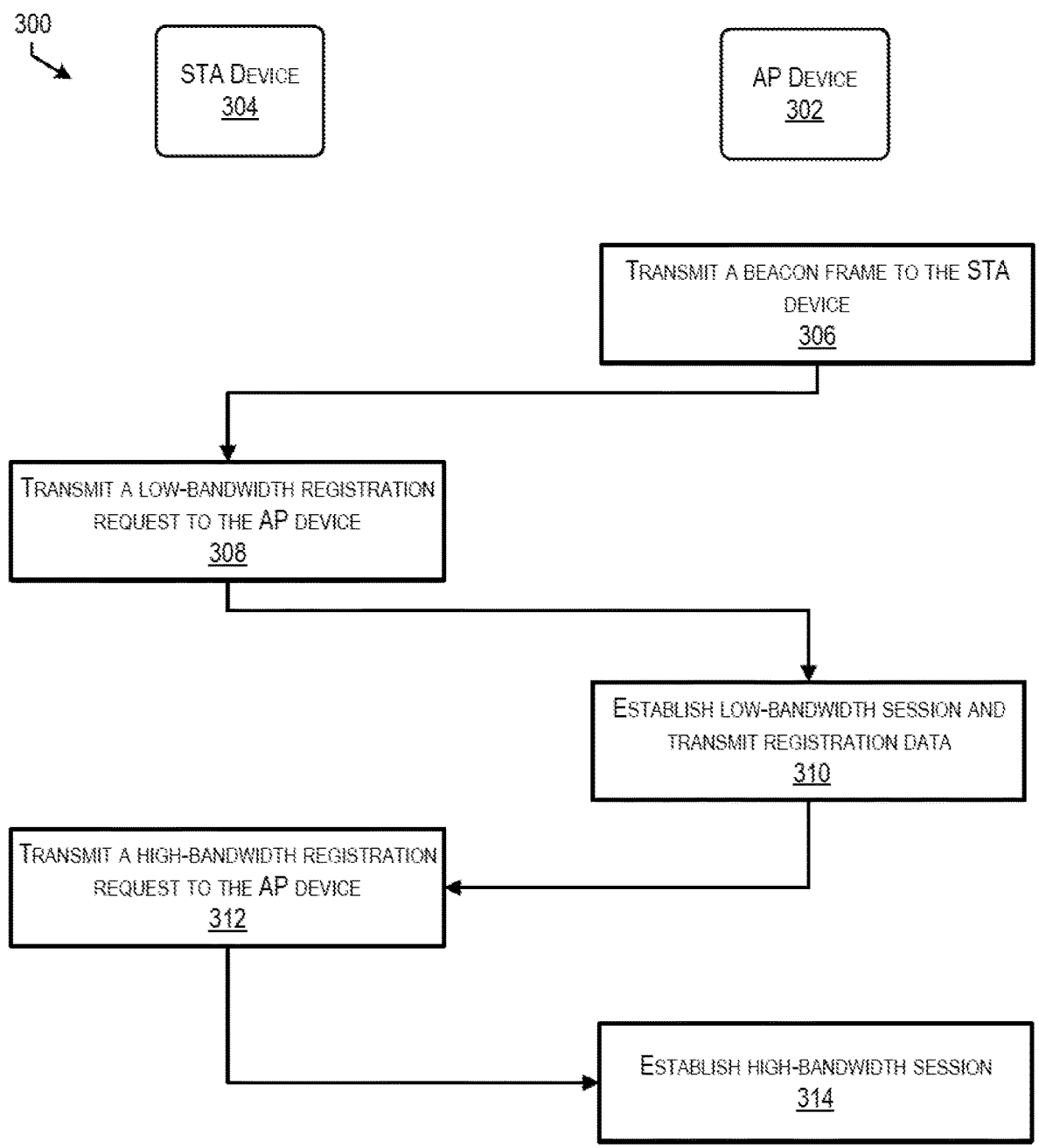
FIG. 3 is a flowchart diagram of an example process for establishing a high-bandwidth wireless communication session between an AP device and a STA device.

FIG. 3 is a flowchart diagram of an example process 300 for establishing a high data rate wireless communication session between an AP device 302 and a STA device 304. The AP device 302 may be at least one of the AP device 106 of FIG. 1 or the AP device 202 of FIG. 2. The STA device 304 may be at least one of one of the STA devices 102 of FIG. 1 or the STA device 204 of FIG. 2.

The process 300 include a set of operations (operations 306, 310, and 314) performed by the AP device 302 and a set of operations (operations 308 and 312) performed by the STA device 304. In particular, at operation 306, the AP device 302 transmits a beacon frame to the STA device 304. The bacon frame may announce the presence of a wireless network broadcast by an AP.

At operation 308, the STA device 304 transmits a low data rate registration request to the AP device 302. The low data rate registration request may be a request for establishing a wireless communication session using a low data rate communication protocol. The low data rate communication protocol may be a sub-GHz communication protocol such as LFR.

At operation 310, the AP device 302 establishes a low data rate wireless communication session between the AP device and the STA device 304. The low data rate wireless communication session may be a wireless communication session that enables the STA device 304 and the AP device 302 to communicate using a low data rate wireless communication protocol (e.g., a low data rate sub-GHz communication protocol such as LFR). In some cases, to establish the low data rate wireless communication session, the AP device 302 determines whether to authenticate the STA device 304 and, if the STA device 304 is authenticated, generates, and provides a device identifier (e.g., an LFR identifier) to the STA device 304. In some cases, the AP device 302 authenticates the STA device 304 based on whether an identifier (e.g., a MAC address or other unique identifier) of the STA device 304 is among a list of identifiers associated with a set of devices that are authorized to access a network associated with the AP device 302.

At operation 312, the STA device 304 transmits a high data rate registration request to the AP device 302 using the low data rate wireless communication session established at operation 310. The high data rate registration request may be a request for establishing a wireless communication session using a high data rate communication protocol. The high data rate communication protocol may be a sub-GHz communication protocol. The bandwidth of the high data rate communication protocol is higher than the bandwidth of the low data rate communication protocol.

At operation 314, the AP device 302 establishes a high data rate wireless communication session between the AP device 302 and the STA device 304. The high data rate wireless communication session may be a wireless communication session that enables the STA device 304 and the AP device 302 to communicate using a high data rate wireless communication protocol (e.g., a high data rate sub-GHz communication protocol such as one with a bandwidth that is within a predefined range of 900 MHZ).

In some cases, operation 314 occurs after the AP device 302 transmits an authentication credential to the STA device 304. The authentication credential may be a credential needed for establishing a wireless communication session associated with the high data rate protocol between the AP device 302 and the STA device 304. An example of the authentication protocol is a password.

In some cases, after the AP device 302 transmits the authentication credential for the high data rate protocol to the STA device 404, the STA device 304 provides the authentication credential to the AP device 302 as part of a request for establishing the high data rate wireless communication session. In some cases, after the AP device 302 receives the request with the authentication credential, the AP device 302 establishes the high data rate wireless communication session between the AP device 302 and the STA device 304.

In some cases, to transmit the authentication credential associated with the high data rate protocol to the STA device 304, the AP device 302 first secures the low data rate communication session used to transmit the authentication credential. For example, the AP device 302 may provide data needed to construct a decryption key to the STA device 304. Afterwards, the AP device 302 may encrypt the authentication credential using a corresponding encryption key and provide the encrypted authentication credential to the STA device 304 using the low data rate wireless communication session. In some cases, the AP device 302 uses the secured low data rate session to transmit other data items, such as to transmit an encrypted Wi-Fi password generated by encrypting the Wi-Fi password using the described decryption key.

In some cases, after the STA device 304 receives the authentication credential from the AP device 302, the STA device 304 includes the credential in all future frames transmitted to the AP device 302 using the high data rate communication session. In some cases, after the STA device 304 receives the authentication credential from the AP device 302, the STA device 304 includes the credential in all future frames transmitted to the AP device 302 using the high data rate communication session if the STA device 304 has not transmitted any frames to the AP device 302 using the high data rate communication session in a threshold period of time. In some cases, after the STA device 304 receives the authentication credential from the AP device 302, the STA device 304 includes the credential in all future frames transmitted to the AP device 302 using the high data rate communication session if the STA device 304 detects that a prior high data rate wireless communication session between the AP device 302 and the STA device 304 is no longer active (e.g., has been terminated due to time lapse).

Figure 4:
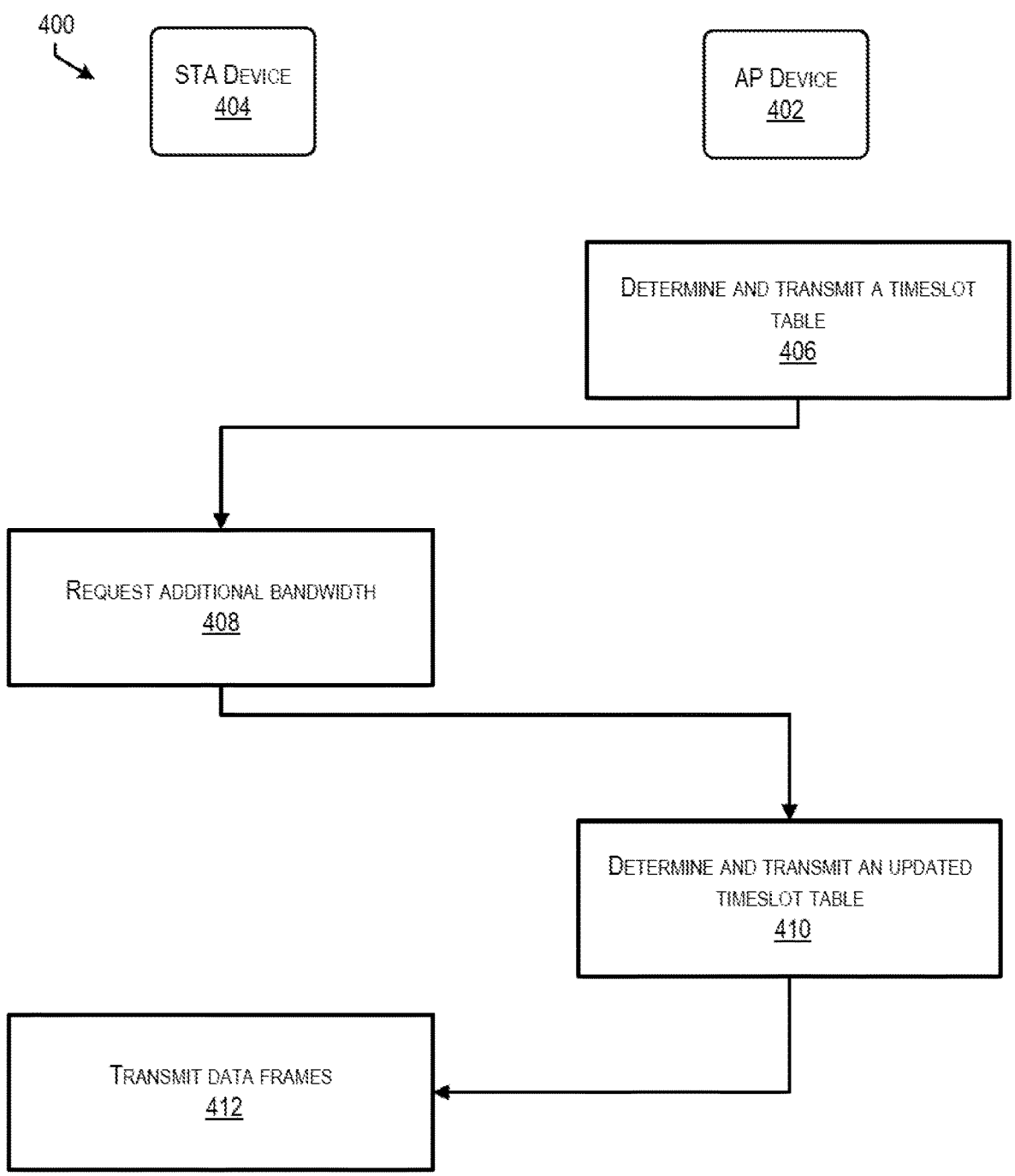
FIG. 4 is a flowchart diagram of an example process for allocating additional bandwidth to a STA device in a high-bandwidth wireless communication session between an AP device and a set of STA devices.

FIG. 4 is a flowchart diagram of an example process 400 for allocating additional bandwidth to a particular STA device 404 in a high data rate wireless communication session between an AP device 402 and a set of STAs including the particular STA device 404. In FIG. 4, AP device 402 may be at least one of the AP device 106 of FIG.

1 or the AP device 202 of FIG. 2. The STA device 404 may be at least one of one of the STA devices 102 of FIG. 1 or the STA device 204 of FIG. 2.

The process 400 include a set of operations (operations 406 and 410) performed by the AP device 402 and a set of operations (operations 408 and 412) performed by the STA device 404. In particular, at operation 406, the AP device 402 determines a transmit a timeslot table to the STA device 404. In some cases, the AP device 402 generates a timeslot table by dividing a period into timeslots and assigns each timeslot to an STA. The timeslot table may, for example, be a table that associates each device identifier for an STA with a set of one or more timeslots. Timeslot tables may be transmitted to STAs as part of beacon frames transmitted before the beginning of the period.

Figure 5:
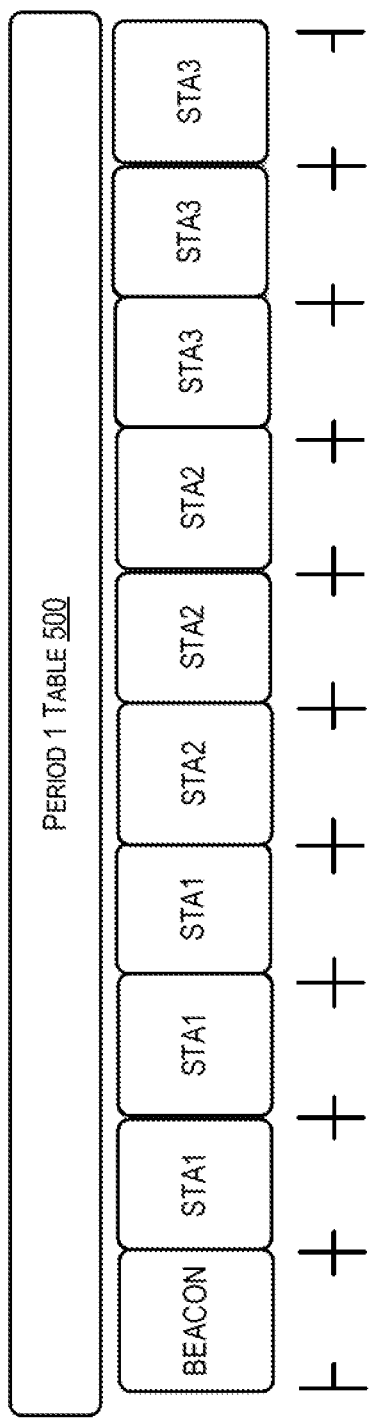
FIG. 5 provides an operational example of a timeslot table for a first period.
Figure 6:
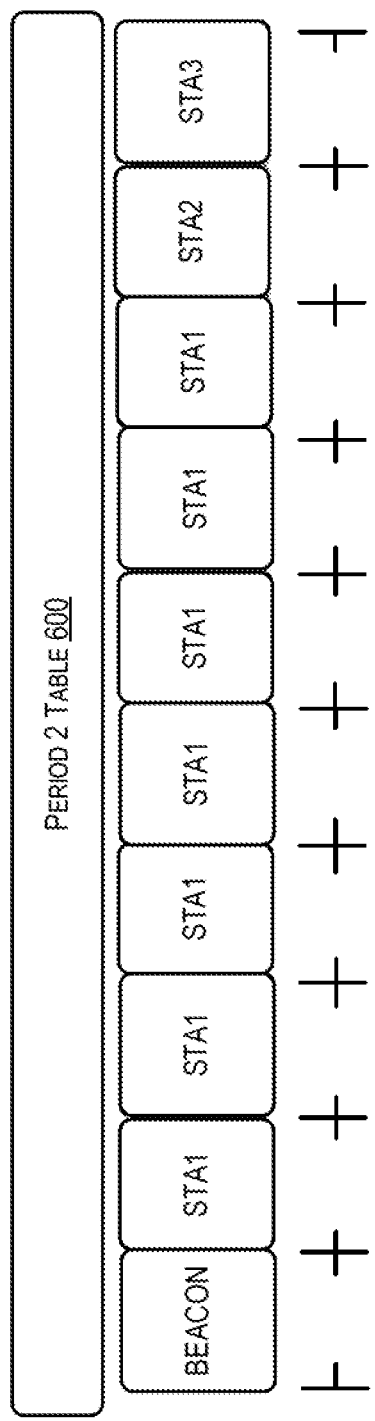
FIG. 6 provides an operational example of an updated timeslot table for a second period.

In some cases, a timeslot table may include timeslots allocated to each STA and one or more timeslots allocated to the AP device 302. In some cases, the timeslot table ensures that each STA is allocated at least one timeslot per period. In some cases, the timeslot table for the pth period has an expiration date that is at the end of the pth period. In some cases, the STA device 404 uses the timeslot table for the pth period until: (i) the expiration of the timeslot table at the end of the pth period, or (ii) a subsequent timeslot table is successfully received and processed if (ii) occurs after (i). Operational examples of two timeslot tables are depicted in FIGS. 5-6 and described below with reference to those two figures.

At operation 408, the STA device 404 requests additional bandwidth from the AP device 402. In some cases, during a timeslot allocated to the STA device 404 in accordance with the timeslot table, the STA device 404 transmits a request for additional bandwidth. The additional bandwidth request may be a request for allocation of additional bandwidth from the available bandwidth of a high data rate protocol (e.g., a high data rate sub-GHz protocol) used for transmitting data frames. The request may include an indication of the amount of additional bandwidth needed and/or an indication of a software application operation performed by the STA device 404 that requires the STA device 404 to have additional bandwidth. For example, the request may represent that the STA device 404 is being used to conduct a videoconference and, as such, the STA device 404 requires additional bandwidth.

At operation 410, the AP device 402 determines an updated timeslot table and transmits the updated timeslot table to the STA device 404. The updated timeslot table may be for a subsequent period that occurs after the period associated with the preceding timeslot table. The expiration date of the timeslot table may be determined based on a time associated with end of the preceding period.

In some cases, to determine the updated timeslot table, the AP device 402 increases the bandwidth allocated to the STA device 404 relative to the preceding timeslot table. In some cases, to determine the updated timeslot table, the AP device 402 increases the bandwidth allocated to the STA device 404 relative to the preceding timeslot table in a manner that ensures that each STA device is allocated a minimum number of (e.g., one) timeslots, but that the remaining timeslots are equitably divided among requesting STAs.

In some cases, to determine the updated timeslot table, the AP device 402 first determines a requested bandwidth amount for each STA. In some cases, each additional bandwidth request may include a requested additional bandwidth amount and/or other data that the AP device 402 can use to determine the requested additional bandwidth amount associated with the STA device.

For example, the additional bandwidth request received from an STA device may include an indication of a software application operation performed by the STA device that requires the STA device to have additional bandwidth. In some cases, the AP device 402 may determine the requested bandwidth amount for an STA device by mapping the software application operation indicated by that device's request to a numerical bandwidth amount.

As another example, the additional bandwidth request received from an STA device may include an indication of data rate associated with data capture (e.g., video data capture) by a data capture device (e.g., a camera device) associated with the STA device. In some cases, the AP device 402 may determine the requested bandwidth amount for an STA device by mapping the data capture rate indicated by that device's request to a numerical bandwidth amount.

In some cases, given a number s STA devices, the allocated timeslot for an sth STA device is determined based on $F_s + A_s$, where $F_s$ is the fixed number of timeslots for the sth STA device and $A_s$ is the additional number of timeslots allocated to the sth STA device. In some cases, $A_s$ is determined based on $$\frac{B_S}{\sum_s^S B_S},$$

where $B_s$ is the requested bandwidth amount for the sth STA device. For example, $A_s$ may be determined based on $$\frac{C(B_S)}{\sum_s^S C(B_S)},$$

where $C(\alpha)$ is a function that converts a requested bandwidth amount $\alpha$ to a corresponding number of timeslots.

At operation 412, the STA device 404 transmits data frames using the high data rate communication protocol during the timeslots allocated to the STA device 404 in the updated timeslot table. The STA device 404 may transmit one or more data frames using the high data rate wireless communication session associated with the high data rate protocol and during the timeslots allocated to the STA device 404 in the updated timeslot table. The high data rate communication protocol may be a sub-GHz high data rate communication protocol, such as a sub-GHz high data rate communication protocol that is associated with a bandwidth of around 900 MHz.

FIG. 5 provides an operational example of a timeslot table 500 for a first period. As depicted in FIG. 5, the timeslot table 500 includes ten timeslots of 100 ms each. The first timeslot is allocated to the beacon transmitted by the AP device, while the next nine timeslots are allocated to the STA devices. AP device may be at least one of the AP device 106 of FIG. 1 or the AP device 202 of FIG. 2. The STA devices may include at least one of one of the STA devices 102 of FIG. 1 or the STA device 204 of FIG. 2.

As depicted in FIG. 5, each STA device is allocated three timeslots. In particular, the first STA device is allocated timeslots 2, 3, and 4; the second STA device is allocated timeslots 5, 6, and 7; and the third STA device is allocated timeslots 8, 9, and 10. If, during one of the timeslots 2, 3, and 4, the first STA device transmits an additional bandwidth request, then the subsequent timeslot table generated and transmitted by the AP device may have the structure that is shown in the next figure.

FIG. 6 provides an operational example of a timeslot table 600 for a second period. As depicted in FIG. 6, the timeslot table 600 includes ten timeslots of 100 ms each. The first timeslot is allocated to the beacon transmitted by the AP device, while the next nine timeslots are allocated to the STA devices. AP device may be at least one of the AP device 106 of FIG. 1 or the AP device 202 of FIG. 2. The STA devices may include at least one of one of the STA devices 102 of FIG. 1 or the STA device 204 of FIG. 2.

As depicted in FIG. 6, in the timeslot table 600, the first STA device is allocated timeslots 2-8, the second STA is allocated timeslot 9, and the third STA is allocated timeslot 10. This may be because, in generating the timeslot table 600, the AP device has relied on an additional bandwidth request received from the first STA device as well as a requirement that each device is allocated at least one timeslot in each period.

Figure 7:
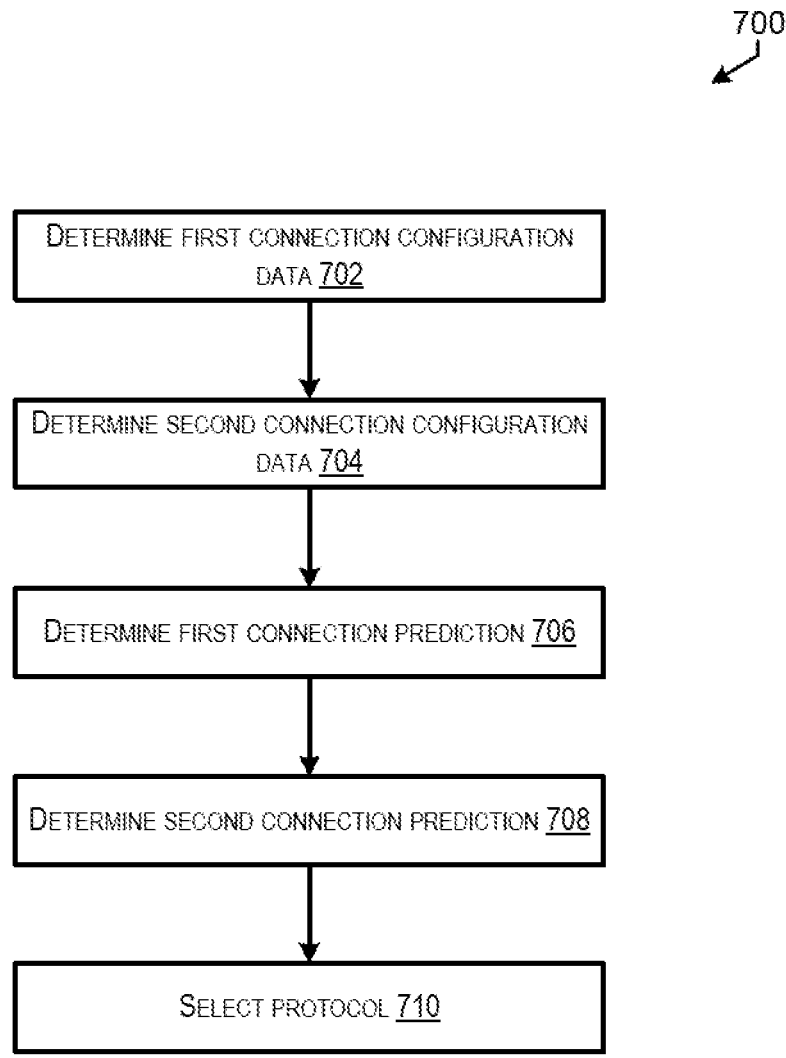
FIG. 7 is a flowchart diagram of an example process for determining whether to select a first wireless communication protocol or a second wireless communication protocol.

FIG. 7 is a flowchart diagram of an example process 700 for determining whether to select a first wireless communication protocol (e.g., a high data rate sub-GHz communication protocol, such as one with a bandwidth around 900 MHZ) or a second wireless communication protocol (e.g., a super-GHz communication protocol such as Wi-Fi). The process 700 is explained as being performed by an STA device, such as at least one of one of the STA devices 102 of FIG. 1 or the STA device 204 of FIG. 2. However, a person of ordinary skill in the relevant device will recognize that the process 700 may be performed by any computing device, such as a backend device.

As depicted in FIG. 7, at operation 702, the STA device determines first connection configuration data for the first wireless communication protocol. The first connection configuration data may include one or more properties associated with a first wireless communication session that is used to communicate data using the first wireless communication protocol. For example, the first connection configuration data may include one or more properties associated with a first wireless communication session that that is used to communicate data between the STA device and an AP device. The AP device may include at least one of the AP device 106 of FIG. 1 or the AP device 202 of FIG. 2.

Examples of first connection configuration data include a distance between two or more devices communicating using the first wireless communication protocol, a signal strength indicator for a signal transmitted between two or more devices communicating using the first wireless communication protocol, and/or the like. In some cases, the first connection configuration may include a distance between an STA device and an AP device that communicate using the first wireless communication protocol. In some cases, the first connection configuration may include a signal strength indicator for one or more signals transmitted between an STA device and an AP device that communicate using the first wireless communication protocol. For example, the first connection configuration may include an RSSI for one or more signals transmitted to an STA device from an AP device using the first wireless communication protocol.

At operation 704, the STA device determines second connection configuration data for the second wireless communication protocol. The second connection configuration data may include one or more properties associated with a second wireless communication session that is used to communicate data using the second wireless communication protocol. For example, the second connection configuration data may include one or more properties associated with a second wireless communication session that that is used to communicate data between the STA device and a router (e.g., a Wi-Fi router). The router may include at least one of the router 112 of FIG. 1 or the router 234 of FIG. 2.

Examples of second connection configuration data include a distance between two or more devices communicating using the second wireless communication protocol, a signal strength indicator for a signal transmitted between two or more devices communicating using the second wireless communication protocol, and/or the like. In some cases, the second connection configuration may include a distance between an STA device and a router that communicate using the second wireless communication protocol. In some cases, the second connection configuration may include a signal strength indicator for one or more signals transmitted between an STA device and a router using the second wireless communication protocol. For example, the second connection configuration may include an RSSI for one or more signals transmitted to an STA device from a router using the second wireless communication protocol.

In accordance with one or more preferred implementations, a RSSI value is expressed in units of decibels per milliwatt (dBm). The received signal strength (RSS) depends on the wireless channel and can in some instances be characterized as representing a desired signal's power as detected by a receiver.

For example, a received signal strength indicator (RSSI) value may be determined based on a voltage level from a baseband signal chain before a baseband amplifier. Output from an RSS circuit may be an analog direct current voltage level. This output can be sampled by an analog-to-digital converter (ADC) to determine RSSI values for a given time. A voltage value (in volts) sampled by an ADC may be converted to a power value for a given impedance Z. e.g. P=V*V/Z. However, in order to convert this into an RSSI value, it is generally desirable to have this power value expressed in decibels per milliwatt, e.g. P(dbm)=10* Log 10(1000*P). Accordingly, a voltage value (in volts) sampled by an ADC may be converted to an RSSI value (in decibels per milliwatt) using, e.g., a formula such as P(dbm)=10* Log 10(1000*V^2/Z).

In accordance with one or more preferred implementations, a device such as a camera device or sync module may intermittently, periodically, or continuously monitor (or may monitor at a desired cadence) the RSSI from one or more other devices and use it to determine a path-loss exponent n in the environment. The path-loss exponent may be calculated using linear-regression with a least-squares fit. Using the determined path-loss exponent n and a reference path-loss level that is at a known distance, a device can determine the distance in between itself and each device that it receives a packet from by tracking its Received Signal Strength (RSS).

In accordance with one or more preferred implementations, a sync module determines a path-loss exponent and communicates it to a camera device and the camera device uses it to determine a distance based on a received signal strength of a signal from the sync module. In accordance with one or more preferred implementations, a sync module determines a received signal strength of a signal from a camera device and communicates the signal strength or a distance determined based thereon to the camera device.

In accordance with one or more preferred implementations, a sync module uses a determined or received distance or signal strength for one or more communication protocols (e.g. a 2.4 GHz Wi-Fi communication scheme and a sub- GHz communication scheme) to select a communication scheme that optimizes power conservation of a camera device and communicates an indication of the selected communication scheme to the camera device. In accordance with one or more preferred implementations, a camera device determines a path-loss exponent. In accordance with one or more preferred implementations, a camera device determines a signal strength of a signal using a first communication scheme received from a sync module or other access point and uses the signal strength and a path-loss exponent to determine a distance to the sync module or other access point. In accordance with one or more preferred implementations, a camera device determines a signal strength of a signal using a second communication scheme received from a sync module or other access point and uses the signal strength and a path-loss exponent to determine a distance to the sync module or other access point. In accordance with one or more preferred implementations, a camera device uses one or more signal strength values for a first communication scheme and/or one or more signal strength values for a second communication scheme to select use of the first communication scheme or second communication scheme for communication of video data. In accordance with one or more preferred implementations, a camera device uses one or more determined distance values for a first communication scheme and/or one or more determined distance values for a second communication scheme to select use of the first communication scheme or second communication scheme for communication of video data. In accordance with one or more preferred implementations, a camera device compares one or more signal strength values for a first communication scheme and/or one or more signal strength values for a second communication scheme to one or more threshold values to select use of the first communication scheme or second communication scheme for communication of video data. In accordance with one or more preferred implementations, a camera device compares one or more determined distance values for a first communication scheme and/or one or more determined distance values for a second communication scheme to one or more thresholds to select use of the first communication scheme or second communication scheme for communication of video data. In accordance with one or more preferred implementations, one or more thresholds for comparison are determined based on previous empirical determination of power usage for communications with one or more communication schemes at various signal strength levels and/or distances.

For example, power levels for a first communication scheme at a first plurality of distances and/or signal strength levels may be determined by experiment and utilized to generate a lookup table (optionally storing information on other factors or metrics as well). Similarly, power levels for a second communication scheme at the first plurality of distances and/or signal strength levels may be determined by experiment and utilized to generate a lookup table (optionally storing information on other factors or metrics as well). The lookup tables may allow for lookup of an estimated power level based on a given distance or signal strength level, and optionally other factors or metrics as well.

Subsequently, an installed camera device may use a measured signal strength level or determined distance for the first communication scheme to estimate a first power use metric for the first communication scheme using the corresponding lookup table. The installed camera device may similarly use a measured signal strength level or determined distance for the second communication scheme to estimate a second power use metric for the second communication scheme using the corresponding lookup table. The camera device may then select either the first communication scheme or the second communication scheme based on comparing the first and second power use metrics.

Alternatively, experimental data or lookup tables may be utilized to determine one or more signal strength or distance thresholds at which the first communication scheme becomes more power efficient than the second communication scheme, and one or more signal strength or distance thresholds at which the second communication scheme becomes more power efficient than the first communication scheme. For example, a camera device may store a threshold value indicating a signal strength value or distance value above which the second communication scheme should be used, and below which the first communication scheme should be used. A plurality of thresholds or ranges may be stored which each indicate a corresponding scheme that should be used based on comparison to that threshold or range (e.g. based on being above or below a specified threshold or falling within a specified range).

It will be appreciated that some communication protocols, such as Wi-Fi, may dynamically adjusts the data rate of a radio depending on the distance or link quality between a station and access point. The further a station is away from the access point the slower the data rate and the larger amount of time and power is spent to transmit a clip.

When compared to a fixed data rate protocol such as a fixed data rate sub-GHZ communication scheme, there may be distances or ranges between the station and access point where Wi-Fi will be better than the fixed data rate sub-GHz communication scheme and distances or ranges where it will be worse with respect to the time and power to transmit a clip.

In accordance with one or more preferred implementations, to identify one or more boundaries where a sub-GHz communication scheme is more/less efficient than Wi-Fi with respect to power consumption, the following testing is performed. First, there is measured for Wi-Fi data rate, RSSI, packet loss rate (if possible), and power consumed as impedance increases between an access point and the camera device. Second, there is measured for the sub-GHZ communication scheme RSSI, packet loss rate, and power consumed on Sedona as impedance increases between an access point and the camera device. These may or may not be the same access point. For example, the first could be a Wi-Fi router while the second could be a sync module. Alternatively, they both could be a sync module.

At operation 706, the STA device determines a first connection prediction for the first wireless communication protocol based on the first connection configuration data. The first connection prediction may represent at least one of a predicted power consumption or a predicted transmission quality associated with transmitting data using the first wireless communication protocol. For example, the first connection prediction may represent at least one of a predicted power consumption associated with transmitting data using the first wireless communication protocol, a predicted packet/data loss rate associated with transmitting data using the first wireless communication protocol, a predicted data rate associated with transmitting data using the first wireless communication protocol, and/or the like.

Accordingly, the first connection prediction may include one or more metrics associated with transmitting data using the first wireless communication protocol. In some cases, to determine a metric associated with the transmitting data using the first wireless communication protocol, the AP device provides at least one variable determined based on the first connection prediction to a model (e.g., a model determined based on historical data associated with past connection sessions that used the first protocol, a trained model, a regression model, and/or the like) and determines the first connection prediction based on the model's output.

In some cases, the STA device determines the first connection prediction by processing the first connection configuration in accordance with a set of records each representing one or more measures (e.g., at least one of a predicted power consumption, a predicted packet loss rate, a predicted data rate, a distance measure, a signal strength indicator, and/or the like) associated with a past connection. For example, each record may include measures associated with a past connection between the AP device and an STA device. As another example, each record may include measures associated with a past connection that used the first wireless communication protocol. As an additional example, each record may include measures associated with a past connection between the AP device and an STA device that used the first wireless communication protocol.

In some cases, the first connection prediction may represent whether transmitting data using the first wireless communication protocol is predicted to consume less power than transmitting data using the second wireless communication protocol. In some cases, to determine whether transmitting data using the first wireless communication protocol is predicted to consume less power than transmitting data using the second wireless communication protocol, the STA device determines whether the first connection configuration satisfies a boundary connection. The boundary condition may describe a point at which data transmission using the second protocol is predicted to consume less power than data transmission using the first protocol. In some cases, the boundary condition represents at least one of a boundary distance or a boundary signal strength indicator. In some cases, the boundary condition is determined based on a set of records. The set of records may include one or more records each describing one or more measures (e.g., at least one of a predicted power consumption, a predicted packet loss rate, a predicted data rate, a distance measure, a signal strength indicator, and/or the like) associated with a past connection that used the first protocol. The set of records may additionally or alternatively include one or more records each describing one or more measures (e.g., at least one of a predicted power consumption, a predicted packet loss rate, a predicted data rate, a distance measure, a signal strength indicator, and/or the like) associated with a past connection that used the second protocol.

In some cases, the first connection prediction may represent whether transmitting data using the first wireless communication protocol is predicted to have a higher transmission quality than transmitting data using the second wireless communication protocol. In some cases, to determine whether transmitting data using the first wireless communication protocol is predicted to have a higher transmission quality than transmitting data using the second wireless communication protocol, the STA device determines whether the first connection configuration satisfies a boundary connection. The boundary condition may describe a point at which data transmission using the second protocol is predicted to have a higher transmission quality than data transmission using the first protocol. In some cases, the boundary condition represents at least one of a boundary distance or a boundary signal strength indicator. In some cases, the boundary condition is determined based on a set of records. The set of records may include one or more records each describing one or more measures (e.g., at least one of a predicted power consumption, a predicted packet loss rate, a predicted data rate, a distance measure, a signal strength indicator, and/or the like) associated with a past connection that used the first protocol. The set of records may additionally or alternatively include one or more records each describing one or more measures (e.g., at least one of a predicted power consumption, a predicted packet loss rate, a predicted data rate, a distance measure, a signal strength indicator, and/or the like) associated with a past connection that used the second protocol.

At operation 708, the STA device determines a second connection prediction for the second wireless communication protocol based on the second connection configuration data. The second connection prediction may represent at least one of a predicted power consumption or a predicted transmission quality associated with transmitting data using the second wireless communication protocol. For example, the second connection prediction may represent at least one of a predicted power consumption associated with transmitting data using the second wireless communication protocol, a predicted packet/data loss rate associated with transmitting data using the second wireless communication protocol, a predicted data rate associated with transmitting data using the second wireless communication protocol, and/or the like.

Accordingly, the second connection prediction may include one or more metrics associated with transmitting data using the second wireless communication protocol. In some cases, to determine a metric associated with the transmitting data using the second wireless communication protocol, the AP device provides at least one variable determined based on the second connection prediction to a model (e.g., a model determined based on historical data associated with past connection sessions that used the second protocol, a trained model, a regression model, and/or the like) and determines the second connection prediction based on the model's output. In some cases, the STA device determines the second connection prediction by processing the second connection configuration in accordance with a set of records each representing one or more measures (e.g., at least one of a predicted power consumption, a predicted packet loss rate, a predicted data rate, a distance measure, a signal strength indicator, and/or the like) associated with a past connection. For example, each record may include measures associated with a past connection between the AP device and an STA device. As another example, each record may include measures associated with a past connection that used the second wireless communication protocol. As an additional example, each record may include measures associated with a past connection between the AP device and an STA device that used the second wireless communication protocol.

In some cases, the second connection prediction may represent whether transmitting data using the second wireless communication protocol is predicted to consume more power than transmitting data using the first wireless communication protocol. In some cases, to determine whether transmitting data using the second wireless communication protocol is predicted to consume more power than transmitting data using the first wireless communication protocol, the STA device determines whether the second connection configuration satisfies a boundary connection. The boundary condition may describe a point at which data transmission using the first protocol is predicted to consume more power than data transmission using the second protocol. In some cases, the boundary condition represents at least one of a boundary distance or a boundary signal strength indicator. In some cases, the boundary condition is determined based on a set of records. The set of records may include one or more records each describing one or more measures (e.g., at least one of a predicted power consumption, a predicted packet loss rate, a predicted data rate, a distance measure, a signal strength indicator, and/or the like) associated with a past connection that used the second protocol. The set of records may additionally or alternatively include one or more records each describing one or more measures (e.g., at least one of a predicted power consumption, a predicted packet loss rate, a predicted data rate, a distance measure, a signal strength indicator, and/or the like) associated with a past connection that used the first protocol.

In some cases, the second connection prediction may represent whether transmitting data using the second wireless communication protocol is predicted to have a lower transmission quality than transmitting data using the first wireless communication protocol. In some cases, to determine whether transmitting data using the second wireless communication protocol is predicted to have a lower transmission quality than transmitting data using the first wireless communication protocol, the STA device determines whether the second connection configuration satisfies a boundary connection. The boundary condition may describe a point at which data transmission using the first protocol is predicted to have a lower transmission quality than data transmission using the second protocol. In some cases, the boundary condition represents at least one of a boundary distance or a boundary signal strength indicator. In some cases, the boundary condition is determined based on a set of records. The set of records may include one or more records each describing one or more measures (e.g., at least one of a predicted power consumption, a predicted packet loss rate, a predicted data rate, a distance measure, a signal strength indicator, and/or the like) associated with a past connection that used the second protocol. The set of records may additionally or alternatively include one or more records each describing one or more measures (e.g., at least one of a predicted power consumption, a predicted packet loss rate, a predicted data rate, a distance measure, a signal strength indicator, and/or the like) associated with a past connection that used the first protocol.

At operation 710, the STA device selects one of the two wireless connection protocols based on the first connection prediction and the second connection prediction. In some cases, the STA device selects the protocol having a lower predicted power consumption. In some cases, the STA device selects the protocol having a higher transmission quality. In some cases, the STA device selects the protocol having an optimal evaluation value, where the evaluation values for the two protocols are determined based on the predicted power consumptions and/or the predicted transmission qualities for the two protocols.

In accordance with one or more preferred implementations, a high data rate sub-GHZ protocol (e.g. a 900 MHz protocol) is designed around a hub- and spoke concept where all communication is from a sync module operating as an AP node to one or more camera devices operating as station nodes and vice-versa. In accordance with one or more preferred implementations, a media access control (MAC) layer of such a protocol is designed to accommodate up to sixteen station devices, with each device given dedicated timeslots in order to communicate with the access point. When a station device needs more bandwidth, it can request it and the access point signals back on a beacon message a new bandwidth allocation.

In accordance with one or more preferred implementations, when a station needs to request more bandwidth, it will create a special request packet and transmit during one of its assigned timeslots. Upon receipt of the bandwidth request, the access point will accommodate the request and in its next beacon will inform all stations to switch to a new timeslot table which will include time for the requesting station to transmit. In accordance with one or more preferred implementations, beacon messages will continue to transmit a current timeslot table and the duration that it will be valid for. In accordance with one or more preferred implementations, in the event of a corrupted beacon message, station devices can continue to operate based on a timeslot table generated from a previously received beacon message data to continue sending data until their bandwidth request has timed out (based on an indicated duration the timeslot table will be valid for).

In accordance with one or more preferred implementations, when a station requests additional bandwidth with a bandwidth request message, an access point will acknowledge this request with an acknowledgment response message. In accordance with one or more preferred implementations, a station can determine that its bandwidth request message has been lost based on not receiving an acknowledgment response message.

In accordance with one or more preferred implementations in which camera devices operate as station devices, camera devices may send bandwidth request messages in the form of video transmission request messages, requesting bandwidth for transmitting video data.

In accordance with one or more preferred implementations, beacon packets for a high data rate sub-GHz protocol (e.g. a 900 MHz protocol) are sent regularly from a sync module operating as an AP node and received by one or more camera devices operating as station nodes. In accordance with one or more preferred implementations, such a beacon packet operates to provide timeslot synchronization and reprogramming of Slot Control Interface (SCI) tables at each station node that indicate to the station node when it is allotted time to transmit.

FIG. 8 illustrates an exemplary schema for a beacon packet, and for an SCI table of such a beacon packet.

The SCI Table portion of the beacon is a variable length field that details which nodes are permitted to transmit and received during the next period. The lower MAC layer is responsible for decoding this table and switching to it at the period boundary.

The table format is divided into three sections. First, a station identifier section provides a list of addresses which can be referenced by the table content. Endpoints not in this list are not allocated TX BW for the current period. Second, a slot entry section provides a list of SCI table entries. These are referenced by the table content. Third, a table content section provides a run length encoded list of what is decoded to populate each station's SCI table.

The station and entry sections form 0-indexed arrays that are referenced by the Station Index and Entry Index fields of the content entries. For each content entry a station node will compare its station ID with the station[station_index]. On a match, the node will populate the next 'repeat' SCI entries with entries[entry_index]. Otherwise those SCI entries will be populated with entries[default_entry].

If the B bit is set in the referenced entry this indicates that all station nodes should treat this as matching. This is the default setting to be 'off' while allowing for all station nodes to be enabled to receive the beacon for the next period.

If the T bit is set the next SCI table entry will be a 'radio turn around' slot where both RX and TX are disabled. If additional slots are required, they can be encoded explicitly.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
   a camera;
   a sub-GHz wireless transceiver;
   one or more processors;
   one or more computer readable media storing computer-executable instructions which, when executed by the one or more processors, cause the electronic device to perform operations comprising
      generating, based on demodulating a first signal received using the sub-GHz wireless transceiver that was modulated using a first modulation scheme, first signal data,
      determining that the first signal data represents a first beacon associated with a first wireless communication protocol,
      determining a first identifier contained in the first signal data, the first identifier being associated with a network device,
      generating, based on demodulating a second signal received using the sub-GHz wireless transceiver that was modulated using a second modulation scheme, second signal data,
      determining that the second signal data represents a second beacon associated with a second wireless communication protocol,
      determining that the second signal data contains the first identifier,
      based on the determining that the second signal data contains the first identifier, transmitting a beacon response to the network device using the second modulation scheme and the second wireless communication protocol,
      generating encoded video data based on image data generated using the camera, and
      transmitting the encoded video data to the network device using the sub-GHz wireless transceiver, the second modulation scheme, and the second wireless communication protocol.

2. The electronic device of claim 1, wherein the first modulation scheme is a Gaussian frequency-shift keying (GFSK) modulation scheme.

3. The electronic device of claim 1, wherein the second modulation scheme is a quadrature amplitude (QAM) modulation scheme.

4. The electronic device of claim 3, wherein the second modulation scheme is QAM-16.

5. The electronic device of claim 1, wherein the one or more computer readable media store computer-executable instructions which, when executed by the one or more processors, cause the electronic device to perform operations comprising transmitting data to the network device using the sub-GHz wireless transceiver and an orthogonal frequency division multiplexing scheme.

6. The electronic device of claim 1, wherein the first identifier comprises a media access control (MAC) address of the network device.

7. The electronic device of claim 1, wherein the first identifier comprises a sync word.

8. The electronic device of claim 1, wherein the electronic device further comprises a passive infrared sensor.

9. The electronic device of claim 1, wherein the electronic device is a video doorbell device.

10. An electronic device comprising:
    a camera;
    a sub-GHz wireless transceiver;
    one or more processors;
    one or more computer readable media storing computer-executable instructions which, when executed by the one or more processors, cause the electronic device to perform operations comprising receiving, using the sub-GHz wireless transceiver, a first beacon transmitted by a network device,
    determining, based on the first beacon and a first identifier associated with the electronic device, a first time,
    sending, at the first time, a video transmission request,
    receiving, using the sub-GHz wireless transceiver, a second beacon transmitted by the network device,
    determining, based on the second beacon and the first identifier associated with the electronic device, a second time,
    generating encoded video data based on image data generated using the camera,
    sending, at the second time using the sub-GHz wireless transceiver, the encoded video data to the network device.

11. The electronic device of claim 10, wherein the one or more computer readable media store computer-executable instructions which, when executed by the one or more processors, cause the electronic device to perform operations comprising updating, based on first data in the first beacon, a current time.

12. The electronic device of claim 10, wherein the one or more computer readable media store computer-executable instructions which, when executed by the one or more processors, cause the electronic device to perform operations comprising updating, based on synchronization data in the first beacon, timing data, and determining, based on time slot data in the first beacon, a first time slot, wherein the first time is determined based on the updating of the timing data and the determining of the first time slot.

13. The electronic device of claim 10, wherein the video transmission request includes the first identifier.

14. The electronic device of claim 10, wherein the one or more computer readable media store computer-executable instructions which, when executed by the one or more processors, cause the electronic device to perform operations comprising
    determining that a first amount of time has passed without receiving a beacon, and
    based on the determining that the first amount of time has passed without receiving a beacon,
       determining, based on the second beacon and the first identifier associated with the electronic device, a third time, generating additional encoded video data based on image data generated using the camera, and sending, at the third time using the sub-GHz wireless transceiver, the additional encoded video data to the network device.

15. An electronic device comprising:
a sub-GHz wireless transceiver;
a second wireless transceiver;
one or more processors;
one or more computer readable media storing computer-executable instructions which, when executed by the one or more processors, cause the electronic device to perform operations comprising
  determining first data representing a first time slot table, the first time slot table comprising a first time slot associated with a first device identifier corresponding to a first camera device,
  transmitting, using the sub-GHz wireless transceiver and a first communication protocol, a first beacon comprising the first data,
  receiving, using the sub-GHz wireless transceiver and the first communication protocol, a video transmission request from the first camera device, the video transmission request comprising second data representing the first device identifier,
  based on the receiving of the video transmission request from the first camera device, determining third data representing a second time slot table, the second time slot table comprising one or more time slots associated with the first device identifier,
  transmitting, using the sub-GHz wireless transceiver and the first communication protocol, a second beacon comprising the third data,
  receiving, at a time corresponding to at least one of the one or more time slots and using the sub-GHz wireless transceiver and the first communication protocol, video data from the first camera device, and
  transmitting, using the second wireless transceiver and a second communication protocol, the video data.

16. The electronic device of claim 15, wherein the electronic device comprises another sub-GHz transceiver.

17. The electronic device of claim 15, wherein the one or more computer readable media store computer-executable instructions which, when executed by the one or more processors, cause the electronic device to perform operations comprising
  transmitting, using the sub-GHz wireless transceiver and a first modulation scheme, a third beacon, and
  transmitting, using the sub-GHz wireless transceiver and a second modulation scheme, a fourth beacon.

18. The electronic device of claim 15, wherein the one or more computer readable media store computer-executable instructions which, when executed by the one or more processors, cause the electronic device to perform operations comprising
  transmitting, using the sub-GHz wireless transceiver and a first modulation scheme, a third beacon,
  generating, based on demodulating a first signal received using the sub-GHz wireless transceiver that was modulated using the first modulation scheme and transmitted by another electronic device, first signal data,
  determining that the first signal data represents a first registration request associated with a third communication protocol, and
  based on the determining that the first signal data represents a first registration request, transmitting access credentials to another electronic device using the sub-GHz wireless transceiver and the first modulation scheme.

19. The electronic device of claim 18, wherein the one or more computer readable media store computer-executable instructions which, when executed by the one or more processors, cause the electronic device to perform operations comprising
  transmitting, using the sub-GHz wireless transceiver and a second modulation scheme, a fourth beacon,
  generating, based on demodulating a second signal received using the sub-GHz wireless transceiver that was modulated using the second modulation scheme and transmitted by another electronic device, second signal data,
  determining that the second signal data represents a second registration request associated with a fourth communication protocol.

20. An electronic device comprising:
a camera;
a plurality of wireless transceivers, the plurality of wireless transceivers including a sub-GHz wireless transceiver;
one or more processors;
one or more computer readable media storing computer-executable instructions which, when executed by the one or more processors, cause the electronic device to perform operations comprising
  determining, based on a first signal received using one of the plurality of wireless transceivers, a first signal strength value,
  determining, based on the first signal strength value, a first distance;
  comparing the first distance to a first value,
  generating encoded video data based on image data generated using the camera, and
  based on the comparing of the distance to the first value, sending the encoded video data to a network device using the sub-GHz wireless transceiver.

21. The electronic device of claim 20, wherein the first value is a stored threshold.

22. The electronic device of claim 20, wherein the plurality of wireless transceivers include a second wireless transceiver that is not a sub-GHz wireless transceiver, wherein the first signal is received using the second wireless transceiver, and wherein one or more computer readable media store computer-executable instructions which, when executed by the one or more processors, cause the electronic device to perform operations comprising
  determining, based on a second signal associated with a second communication scheme that was received using the sub-GHz wireless transceiver, a second signal strength value corresponding to the second communication scheme; and
  determining, based on the second signal strength value, the first value.

23. The electronic device of claim 20, wherein the first signal was received using the sub-GHz wireless transceiver.

24. The electronic device of claim 20, wherein the first distance is determined based on a path-loss exponent value.

25. A method comprising:
  generating, based on demodulating a first signal received using a sub-GHz wireless transceiver that was modulated using a first modulation scheme, first signal data,
  determining that the first signal data represents a first beacon associated with a first wireless communication protocol, determining a first identifier contained in the first signal data, the first identifier being associated with a network device, generating, based on demodulating a second signal received using the sub-GHz wireless transceiver that was modulated using a second modulation scheme, second signal data, determining that the second signal data represents a second beacon associated with a second wireless communication protocol, determining that the second signal data contains the first identifier, based on the determining that the second signal data contains the first identifier, transmitting a beacon response to the network device using the second modulation scheme and the second wireless communication protocol, generating encoded video data based on image data generated using a camera, and transmitting the encoded video data to the network device using the sub-GHz wireless transceiver, the second modulation scheme, and the second wireless communication protocol.

26. The method of claim 25, wherein the first modulation scheme is a Gaussian frequency-shift keying (GFSK) modulation scheme.

27. The method of claim 25, wherein the second modulation scheme is a quadrature amplitude (QAM) modulation scheme.

28. The method of claim 25, wherein the second modulation scheme is QAM-16.

29. The method of claim 25, further comprising transmitting data to the network device using the sub-GHz wireless transceiver and an orthogonal frequency division multiplexing scheme.

30. The method of claim 25, wherein the first identifier comprises a media access control (MAC) address of the network device.

31. The method of claim 25, wherein the first identifier comprises a sync word.

32. A method performed by an electronic device comprising:
receiving, using a sub-GHz wireless transceiver, a first beacon transmitted by a network device,
determining, based on the first beacon and a first identifier associated with the electronic device, a first time,
sending, at the first time, a video transmission request,
receiving, using the sub-GHz wireless transceiver, a second beacon transmitted by the network device,
determining, based on the second beacon and the first identifier associated with the electronic device, a second time,
generating encoded video data based on image data generated using a camera,
sending, at the second time using the sub-GHz wireless transceiver, the encoded video data to the network device.

33. The method of claim 32, further comprising updating, based on first data in the first beacon, a current time.

34. The method of claim 32, further comprising:
updating, based on synchronization data in the first beacon, timing data; and
determining, based on time slot data in the first beacon, a first time slot, wherein the first time is determined based on the updating of the timing data and the determining of the first time slot.

35. The method of claim 32, wherein the video transmission request includes the first identifier.

36. The method of claim 32, further comprising
determining that a first amount of time has passed without receiving a beacon; and
based on the determining that the first amount of time has passed without receiving a beacon:
determining, based on the second beacon and the first identifier associated with the electronic device, a third time;
generating additional encoded video data based on image data generated using the camera; and
sending, at the third time using the sub-GHz wireless transceiver, the additional encoded video data to the network device.

37. A method comprising:
determining first data representing a first time slot table, the first time slot table comprising a first time slot associated with a first device identifier corresponding to a first camera device,
transmitting, using a sub-GHz wireless transceiver and a first communication protocol, a first beacon comprising the first data,
receiving, using the sub-GHz wireless transceiver and the first communication protocol, a video transmission request from the first camera device, the video transmission request comprising second data representing the first device identifier,
based on the receiving of the video transmission request from the first camera device, determining third data representing a second time slot table, the second time slot table comprising one or more time slots associated with the first device identifier,
transmitting, using the sub-GHz wireless transceiver and the first communication protocol, a second beacon comprising the third data,
receiving, at a time corresponding to at least one of the one or more time slots and using the sub-GHz wireless transceiver and the first communication protocol, video data from the first camera device, and
transmitting, using a second wireless transceiver and a second communication protocol, the video data.

38. The method of claim 37, further comprising
transmitting, using the sub-GHz wireless transceiver and a first modulation scheme, a third beacon; and
transmitting, using the sub-GHz wireless transceiver and a second modulation scheme, a fourth beacon.

39. The method of claim 37, further comprising
transmitting, using the sub-GHz wireless transceiver and a first modulation scheme, a third beacon;
generating, based on demodulating a first signal received using the sub-GHz wireless transceiver that was modulated using the first modulation scheme and transmitted by another electronic device, first signal data;
determining that the first signal data represents a first registration request associated with a third communication protocol; and
based on the determining that the first signal data represents a first registration request, transmitting access credentials to another electronic device using the sub-GHz wireless transceiver and the first modulation scheme.

40. The method of claim 37, further comprising
transmitting, using the sub-GHz wireless transceiver and a second modulation scheme, a fourth beacon;
generating, based on demodulating a second signal received using the sub-GHz wireless transceiver that was modulated using the second modulation scheme and transmitted by another electronic device, second signal data; and determining that the second signal data represents a second registration request associated with a fourth communication protocol.

41. A method comprising:

determining, based on a first signal received using one of a plurality of wireless transceivers, a first signal strength value, wherein the plurality of wireless transceivers includes a sub-GHz wireless transceiver;

determining, based on the first signal strength value, a first distance;

comparing the first distance to a first value;

generating encoded video data based on image data generated using a camera; and based on the comparing of the distance to the first value, sending the encoded video data to a network device using the sub-GHz wireless transceiver.

42. The method of claim 41, wherein the first value comprises a stored threshold.

43. The method of claim 41, wherein the plurality of wireless transceivers include at least a second wireless transceiver that is not a sub-GHz wireless transceiver, wherein the first signal is received using the second wireless transceiver, and further comprising:

determining, based on a second signal associated with a second communication scheme that was received using the sub-GHz wireless transceiver, a second signal strength value corresponding to the second communication scheme; and determining, based on the second signal strength value, the first value.

44. The method of claim 41, wherein the first distance is determined based on a path-loss exponent value.

* * * * *